(12) United States Patent
Döhring et al.

(10) Patent No.: US 11,702,843 B2
(45) Date of Patent: Jul. 18, 2023

(54) COATED PANEL AND METHOD FOR MANUFACTURING A COATED PANEL

(71) Applicant: Xylo Technologies AG, Niederteufen (CH)

(72) Inventors: Dieter Döhring, Großenhain (DE); Manfred Biehler, Ludwigshafen (DE)

(73) Assignee: Xylo Technologies AG, Niederteufen (CH)

( * ) Notice: Subject to any disclaimer, the term of this patent is extended or adjusted under 35 U.S.C. 154(b) by 548 days.

(21) Appl. No.: 16/326,494

(22) PCT Filed: Aug. 19, 2016

(86) PCT No.: PCT/EP2016/069689
§ 371 (c)(1),
(2) Date: Feb. 19, 2019

(87) PCT Pub. No.: WO2018/033215
PCT Pub. Date: Feb. 22, 2018

(65) Prior Publication Data
US 2021/0285226 A1   Sep. 16, 2021

(51) Int. Cl.
*E04F 13/08*   (2006.01)
*B05D 1/02*   (2006.01)
(Continued)

(52) U.S. Cl.
CPC .............. *E04F 13/0866* (2013.01); *B05D 1/02* (2013.01); *B05D 1/28* (2013.01); *B05D 1/305* (2013.01);
(Continued)

(58) Field of Classification Search
CPC .............. E04F 13/0866; E04F 13/0894; E04F 15/02038; E04F 15/02183; E04F 15/107;
(Continued)

(56) References Cited

U.S. PATENT DOCUMENTS

| 5,871,824 A | 2/1999 | Bates |
| 6,533,021 B1 | 3/2003 | Shibata et al. |

(Continued)

FOREIGN PATENT DOCUMENTS

| CN | 1232485 A | 10/1999 |
| CN | 1946647 A | 4/2007 |

(Continued)

OTHER PUBLICATIONS

Decision to Grant for corresponding Belarussian Patent Application No. 20190077, dated Jan. 28, 2021.
(Continued)

*Primary Examiner* — Gisele D Ford
(74) *Attorney, Agent, or Firm* — Renner, Otto, Boisselle & Sklar, LLP

(57) ABSTRACT

The present invention relates to a method for the manufacturing of a coated panel, in particular a wall, ceiling or flooring panel for applications in outdoor areas, as well as such a panel. The method comprises the following steps: providing a carrier plate of mineral wool and/or glass wool, comprising a front side and a rear side, applying a primer onto the front side of the carrier plate, thereafter applying a liquid first oligomer in an amount of 30 to 150 g/m² onto the front side of the carrier plate; thereafter applying a liquid second oligomer, which differs from the first oligomer, in an amount of 30 to 180 g/m² onto the wet surface of the before applied layer of the first oligomer.

28 Claims, 2 Drawing Sheets

Figure 1:
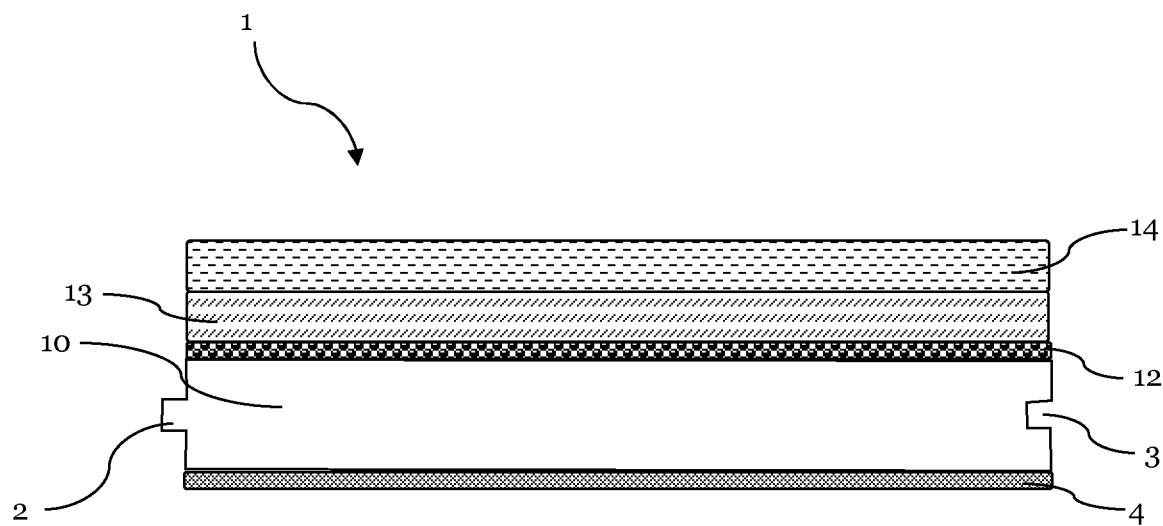

(51) Int. Cl.
| | |
|---|---|
| *B05D 1/28* | (2006.01) |
| *B05D 1/30* | (2006.01) |
| *B05D 7/00* | (2006.01) |
| *C03C 13/06* | (2006.01) |
| *C03C 25/326* | (2018.01) |
| *C03C 25/50* | (2006.01) |
| *C09D 5/00* | (2006.01) |
| *C09D 175/14* | (2006.01) |
| *E04F 15/02* | (2006.01) |
| *E04F 15/10* | (2006.01) |

(52) U.S. Cl.
CPC .............. *B05D 7/582* (2013.01); *C03C 13/06* (2013.01); *C03C 25/326* (2013.01); *C03C 25/50* (2013.01); *C09D 5/002* (2013.01); *C09D 175/14* (2013.01); *E04F 13/0894* (2013.01); *E04F 15/02038* (2013.01); *E04F 15/02183* (2013.01); *E04F 15/107* (2013.01); *C03C 2213/00* (2013.01); *E04F 2201/043* (2013.01)

(58) Field of Classification Search
CPC ....... E04F 2201/043; B05D 1/02; B05D 1/28; B05D 1/305; B05D 7/582; C03C 13/06; C03C 25/326; C03C 25/50; C03C 2213/00; C09D 5/002; C09D 175/14
See application file for complete search history.

(56) References Cited

U.S. PATENT DOCUMENTS

| | | | | |
|---|---|---|---|---|
| 6,716,891 B1* | 4/2004 | Meisenburg | ......... | C09D 175/16 428/419 |
| 10,828,823 B2* | 11/2020 | Hase | ........ | B32B 33/00 |
| 2003/0118747 A1* | 6/2003 | Blum | .......... | C09D 167/07 427/557 |
| 2004/0058083 A1* | 3/2004 | Lettmann | .......... | C08G 18/622 427/407.1 |
| 2004/0101629 A1* | 5/2004 | Baumgart | .......... | C23C 28/00 427/407.1 |
| 2004/0132843 A1* | 7/2004 | Baumgart | .......... | C09D 175/16 521/155 |
| 2007/0066704 A1* | 3/2007 | Schwalm | ......... | C08G 18/4854 522/173 |
| 2008/0032037 A1* | 2/2008 | Frey | .......... | G01N 21/8422 427/9 |
| 2008/0260959 A1* | 10/2008 | Gonzalez | .......... | C09D 133/14 427/386 |
| 2008/0311309 A1* | 12/2008 | Daiss | ............ | B05D 3/066 427/508 |
| 2009/0004468 A1* | 1/2009 | Chen | .......... | C04B 41/483 524/451 |
| 2010/0173085 A1* | 7/2010 | Jariwala | ............ | C08J 7/0427 525/55 |
| 2012/0136111 A1* | 5/2012 | Schwalm | ........... | C09D 175/14 524/539 |
| 2013/0109804 A1* | 5/2013 | Kusaka | .......... | A61L 29/06 528/370 |
| 2013/0131268 A1* | 5/2013 | Buckmann | ............ | C09D 4/00 427/532 |
| 2015/0218408 A1* | 8/2015 | Becker | ............. | C08L 61/24 427/430.1 |
| 2016/0009923 A1* | 1/2016 | Mitsumoto | ........... | G02B 5/208 204/192.1 |
| 2016/0136913 A1* | 5/2016 | Hannig | ............... | B29D 99/001 425/105 |
| 2016/0153190 A1 | 6/2016 | Doehring | | |
| 2016/0168868 A1* | 6/2016 | Song | ............. | E04F 15/206 156/60 |
| 2016/0297226 A1* | 10/2016 | Biehler | ............. | B41M 5/38214 |
| 2019/0092946 A1* | 3/2019 | Andersen | ............ | C08G 18/771 |

FOREIGN PATENT DOCUMENTS

| | | |
|---|---|---|
| CN | 101522746 A | 9/2009 |
| CN | 102448905 A | 5/2012 |
| CN | 103717670 A | 4/2014 |
| CN | 105377454 A | 3/2016 |
| DE | 198 26 712 A1 | 12/1999 |
| DE | 199 13 353 A1 | 9/2000 |
| FR | 2 121 315 A6 | 8/1972 |
| JP | 2011-1423 A | 1/2011 |
| RU | 2 341 546 C2 | 12/2008 |
| WO | 98/33761 | 8/1998 |
| WO | 0148332 | 7/2001 |
| WO | 0188306 | 11/2001 |
| WO | 2010/063612 A1 | 6/2010 |
| WO | 2014/053186 A1 | 4/2014 |

OTHER PUBLICATIONS

International Search Report and Written Opinion for corresponding Patent Application No. PCT/EP2016/069689 dated Nov. 24, 2016.
Original and English Translation of First Chinese Office Action issued for corresponding Chinese Application No. 201680088553.4, dated May 20, 2021.
Russian Decision to Grant for corresponding Russian Patent Application No. 2019106715/03(012948) dated Nov. 11, 2019 along with the English Translation.

* cited by examiner

COATED PANEL AND METHOD FOR MANUFACTURING A COATED PANEL

1. FIELD OF THE INVENTION

The present invention relates to a coated panel and a method for manufacturing a coated panel, in particular a wall, ceiling or floor panel, having a carrier plate of mineral wool or glass wool.

2. BACKGROUND OF THE INVENTION

From the prior art a number of panels for wall, ceiling or floor coverings are known. For example, for interior use so-called laminate panels are widely used as floor covering. Laminate panels are relatively inexpensive and easy to handle. Typically, they comprise a carrier plate made from medium density fiberboard (MDF) or high density fiberboard (HDF) material, whereby on the top side thereof a decor paper impregnated with a melamine resin is applied. By pressing under application of heat and pressure, the resin is cured, so that a highly abrasion resistant surface is created. To increase the abrasion resistances, often abrasion resistant particles are applied onto the surface before the pressing step, in particular particles of corundum. One disadvantage of such laminate panels is that they are hardly suitable for applications in outdoor areas, where they are subjected to weather conditions and moisture, for which they are typically not suitable.

As an alternative to laminate panels, high-quality panels based on PVC are known, which are marketed under the name LVT (Lacquered Vinyl Tile). These are made by gluing a decor paper onto a soft PVC layer, respectively plate, to provide the visible surface of the PVC with the desired decor. As alternative for decor papers also the use of plastic foils is known, which likewise can, for example, be provided with a decorative decor. Also these PVC-based panels are hardly suitable for applications in outdoor areas, where they are subjected to UV radiation and moisture.

From the WO 2014/053186 of the same applicant an improved flooring panel for an outdoor area is known, whereby a carrier plate is used, which is better suitable for applications in outdoor areas. The carrier plate consists of MDF or HDF made from acetylated wood, of a fiber cement plate or a preferably particularly treated PVC panel.

The present invention is directed to the task to improve the known prior art and to provide in particular an improved panel and method for the manufacturing thereof, whereby the panel is particularly suitable for applications in outdoor areas. The new panels on the basis of a carrier plate of mineral wool or glass wool should have a good stability compared to known materials when used in outdoor areas and delete the disadvantage of the high alkalinity of fiber cement panels. These and other tasks, which the reader will understand when reading the following description, are solved with a method for the manufacturing of a panel according to claim 1 and a panel according to claims 19 and 20.

3. DETAILED DESCRIPTION OF THE INVENTION

According to the present invention, a method for manufacturing of a coated panel is provided, in particular of a wall, ceiling or flooring panel for outdoor areas. In a first step, a carrier plate of mineral wool or glass wool is provided, which comprises a front side (major front surface) and a rear side (major rear surface). The carrier plate is preferably relatively rigid to facilitate the mounting of such panels to achieve a wall, ceiling or floor covering. It can be treated on its front and rear side, and/or provided with additional functional layers to, for example, improve its resistance against harsh environmental conditions. According to the invention, a primer is applied onto the front side of the carrier plate. The primer serves to improve the adhesion of the subsequently applied layers onto the front side of the carrier plate. The primer is in particular important for applications in outdoor areas: it has to be chosen such that it forms a durable barrier layer to prevent that water absorbed by the carrier plate can reach the additional layers applied on top of the primer layer. If that is not the case, there is a risk that e.g. upon repeatedly freezing the additional layers separate from the carrier plate.

Preferably, the primer comprises isocyanate or is based on isocyanate. Preferably, the primer is applied in an amount of 3 to 300 $g/m^2$, more preferred 15 to 150 $g/m^2$ and particularly preferred 30 to 80 $g/m^2$. The application can be done by means of a roll applicator. The primer penetrates upon application into the surface of the fiber plate. Even if the isocyanate needs some time to form a polyurethane with water, the next application steps can follow immediately.

Preferably, additional base coat layers are applied onto the primer. These base coat layers can, for example, be applied as filler layers with suitable roll applicators directly onto the primer and cured by means of elevated temperatures or by means of UV radiation. The filler layers are applied preferably in an amount of 0 to 150 $g/m^2$, more preferably 10 to 100 $g/m^2$ and most preferably 12 to 40 $g/m^2$. To achieve high-quality optical surfaces, preferably in addition a printing base coat is applied by means of roll applicators or by means of curtain coating (and in particular preferably onto the base coat layer), whereby the drying or curing is again achieved by means of elevated temperature or UV radiation. The amount of printing base coat applied is preferably in the range of 0 to 100 $g/m^2$, more preferred between 15 and 90 $g/m^2$. In addition, the surface may be printed with a decor, as for example a wood or stone imitation. The print can be achieved with any kind of suitable printing method, however, preferably by means of digital printing with water-based or UV-curable inks.

Onto the thus prepared plate a first oligomer 1A is applied in an amount of 30 to 150 $g/m^2$. The oligomer 1A is preferably liquid and it is e.g. applied by means of a suitable roll application method or by pouring or spraying. After that, a second oligomer, which may differ chemically from the first oligomer, is applied in an amount of 30 to 180 $g/m^2$ onto the still wet surface of the prior applied layer of the first oligomer 1A. This is done preferably by a curtain coating method or by spraying. The second oligomer can also be applied firstly onto a transfer foil, and this foil is supplied to the still wet surface of the first oligomer layer, i.e. it is arranged thereon. In the following step, the two applied wet oligomers are cured together, for example by using a suitable radiation which is radiated through the foil and by subsequently removing the foil again. If no transfer foil is used, curing should occur preferably under inert conditions, i.e. under exclusion of oxygen. The transfer foil provides such oxygen exclusion.

Deviating from the above-mentioned structure first oligomer 1A and second oligomer also multiple oligomer layers may be applied to further increase the durability. In such a case it is advantageous that the first oligomer 1A is slightly gelled by means of radiation and thus fixed onto the plate. Over this first oligomer 1A another layer of the first oligomer 1A or of a modified first oligomer 1B may be applied. It is decisive that the respective topmost layer remains wet and that the second oligomer is applied wet as well, and that finally all these layers are polymerized together. In a further preferred embodiment, the step of application of the first oligomer 1A is done in at least two partial steps. Preferably, in a first partial step, the first oligomer 1A is supplied in an amount of 30 to 100 g/m² (more preferred of 35 to 90 g/m²) in liquid form and this layer is subsequently slightly gelled. To "slightly gel" means in this connection that the oligomer is not fully cured, but only to a small part. Slightly gelling should preferably solidify the applied oligomer to such an extent that it is possible to apply in a second partial step a further application of the first oligomer 1A or a modified oligomer 1B by means of roll applicators. As it is known to the skilled person, roll applicators are not particularly suitable for a wet-on-wet application of different oligomers, since at the second roll a mixture of the oligomers can occur, which can be disadvantageous. By slightly gelling the first oligomer applied in the first partial step, such a mixture or contamination at the second roll can be prevented. In the second partial step, 10 to 90 g/m² of the first oligomer 1A or a modified oligomer 1B is applied onto the slightly gelled surface, i.e. preferably in an amount that the desired end amount of 30 to 180 g/m² is achieved.

Onto the finally applied, still wet, not yet gelled layer, the second oligomer is applied in liquid form. The application is preferably done by curtain coating, spraying or by means of a transfer foil. During this wet-on-wet application a mixture of the two topmost oligomer layers of the first and second oligomers occurs at least in the border region. It is advantageous that the thus coated material is polymerized under inert conditions, for example under exclusion of oxygen, since thereby a high double bond conversion and thus a good interlinking is achieved.

With the thus prepared layer structure two effects are achieved: 1) Due to the relatively large layer thickness, a sufficient UV protection against solar radiation in outdoor areas of the printing decor as well as of the whole coating can be achieved. 2) By choosing suitable first oligomers 1A, 1B and the second, respectively topmost oligomer, the mechanical properties of the coating can be precisely adjusted, as it is for example necessary with highly loaded floorings in outdoor areas. The uppermost surface needs to be hard and scratch-proof to withstand the load. This can for example be achieved by a high degree of interlinking. However, if the whole coating above the decor layer would be provided with such a high interlinking, this polymerized coating would be too brittle and could rupture. To avoid this and to significantly improve the mechanical as well as the temperature resistivity, the first oligomers 1A and respectively also 1B are chosen advantageously with a lower interlinking potential.

Preferably, the first oligomer 1A/B is based on one or more of the following materials:

In principle, aliphatic structures are preferred compared to aromatic compounds, since they lead to significantly improved weather resistance. Suitable polyurethane acrylates are in particular urethane-group-containing compounds, which comprise in average 2 to 10, in particular 2 to 8.5 acrylate or methacrylate groups and which are preferably derivable by reacting of aromatic or aliphatic di- or oligo-isocyanates with hydroxyalkyl-acrylates or hydroxyalkyl-methacrylates. Examples for these compounds are the Laromer® types, UA19T, UA9028, UA9030, LR8987, UA9029, UA9033, UA9047, UA9048, UA9050, UA9072 of the company BASF SE, whereby some of those are mixtures of monomers.

If an additional intermediate layer is applied, one can also use oligomer 1A, but one can also use a modified first oligomer 1B, which consists essentially of the same chemical compounds described for the first oligomer 1A, whereby, however, the molar relationship of these compounds is preferably modified (i.e. the mixture of the chemical compounds is modified), so that different mechanical properties, as in particular a slightly increased hardness in this layer can be achieved.

The second oligomer can be based on the same chemical compounds as the first oligomer 1A, 1B, however, the composition should preferably be chosen such that the upper respectively topmost layer can achieve a significantly higher cross-linking. For example, the amount of cross-linking and thus also the hardness can for example be influenced by the amount of Laromer HDDA (hexanediol diacrylate) of the company BASF. HDDA consists of small molecules that lead to a higher cross-linking: i.e. when increasing the amount of HDDA also the cross-linking and thus the resulting hardness is increased. It is also possible to use polyester or polyether structures, however, the weather resistance is degraded thereby.

The weather resistance of the above-described oligomers 1A, 1B and 2 can, aside from a choice of suitable oligomers and monomers, also be improved by using UV absorbers and sterically hindered amines. Suitable stabilizers comprise typical UV absorbers as oxanilides, triacines and benzotriazol (e.g. derivable as Tinuvin® by the company BASF SE) and benzophenone. These can be used alone or together with suitable radical interceptors, as for example sterically hindered amines as 2,2,6,6-tetramethylpiperidine, 2,6-di-tert-butylpiperidine or derivates therefrom, as for example bis-(2,2,6,6-tetra-methyl-4-piperidyl)sebacinat. Stabilizers are typically used in amounts of 0.5 to 5 weight percent in relation to the "solid" compounds in the mixture.

Example

Oligomer 1 can be made in the following composition, whereby the chemical compounds can in principle also be used for oligomer 2 (but in a different relative mixture):

| | |
|---|---|
| Laromer LR 8987 | 94.0 percentage by weight |
| Tinuvin 400 | 3.0 percentage by weight |
| Tinuvin 292 | 1.5 percentage by weight |
| Irgacure 819 | 1.5 percentage by weight |

Preferably, the inventive composition comprises at least one photo initiator. Photo initiators are substances, which decompose due to irradiation with UV radiation, i.e. with a wavelength below 420 nm, and in particular below 400 nm, by forming radicals and thereby triggering a polymerization of the ethylenitically unsaturated double bonds. Preferably, the radiation-curable, liquid composition comprises at least one photo initiator, which has an absorption band that comprises a maximum in the range of 220 to 420 nm, in particular in the range of 240 to 400 nm. Preferably, the non-watery, liquid, radiation-curable composition comprises at least one photo initiator, which has an absorption band with a maximum in the range of 220 to 420 nm, in particular a maximum in the range of 240 to 420 nm and particularly a maximum in the range of 340 to 420 nm. This is advantageous to balance out the absorbing effect of the above-described UV absorbers during the polymerization of the coating composition. Photo initiators with an absorption maximum in the short wave UV range would be completely absorbed by the UV absorbers and therefore not sufficiently initiate the polymerization.

Photo initiators can for example be chosen from photo initiators known by the skilled person, as for example described in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

Suitable are for example mono- or bi-sacylphosphinoxide, as for example mentioned in EP-A 7 508, EP-A 57 474, DE-A 196 18 720, EP-A 495 751 or EP-A 615 980, as for example 2,4,6-Trimethylbenzoyldiphenylphosphinoxide (Irgacure® TPO of the company BASF SE), Ethyl-2,4,6-trimethylbenzoylphenylphosphinat (Irgacure® TPO L der BASF SE), Bis-(2,4,6-trimethylbenzoyl)-phenyl phosphine oxide (Irgacure® 819 der Firma BASF SE), benzophenone, hydroxyacetophenone, phenylglyoxyl acid and its derivates or mixtures of these photo initiators. Examples are: benzophenone, aceto-phenone, aceto-naphthoquinone, methyl ethyl ketone, α-phenyl-butyrophenone, p-morpholino-propiophenone, 4-morpholino-benzophenone, 4-morpholino-deoxybenzoine, p-diacetylbenzene, 4-amino-benzophenone, 4'-methoxy-acetophenone, β-methyl-anthraquinon, tert-butyl-anthraquinon, anthraquinone-carboxyl acid, benzaldehyd, α-Tetralon, 9-acetyl-phenanthrene, 2-ace-tyl-phenanthren, 10-thioxanthen, 3-acetyl-phenanthrene, 3-acetyl-indole, 9-fluorenone, 1-indanone, 1,3,4-triacetyl-benzene, thioxanthen-9-on, xanthen-9-on, 2,4-di-methyl-thioxanthone, 2,4-di-ethyl-thioxanthone, 2,4-di-iso-propyl-thioxanthone, 2,4-di-chlor-thioxanthone, benzoin, benzoin-iso-butylether, benzoin-tetrahydro-pyranylether, benzoin-methylether, benzoin-ethylether, benzoin-butylether, benzoin-iso-propylether, 7-H-benzoin-methylether, benz[de]anthracen-7-on, 1-naphthal-dehyde, 4,4'-bis(dimethyl-amino)benzophenone, 4-phenylbenzophenone, 4-chlor-benzophenone, 1-benzylcyclohexan-1-ol, 2-hydroxy-2,2-dimethylacetophenone, 2,2-dimethoxy-2-phenylacetophenone, 2,2-di-ethoxy-2-phenylacetophenone, 1,1-dichloroacetophenone, 1-hydroxyacetophenone, acetophenondimethylketal, o-methoxybenzophenone, triphenylphosphine, tri-(o-tolyl)phosphine, benz(a)anthracene-7,12-dione, 2,2-diethoxyacetophenone, benzilketal, such as benzildimethylketal, 2-methyl-1-[4-(methylthio)phenyl]-2-morpholinopropane-1-one, anthrachinones such as 2-methylanthrachinone, 2-ethylanthrachinone, 2-tert-Butylanthrachinone, 1-chlor-anthrachinone, 2-amylanthrachinone and 2,3-butanedione.

Suitable are also photo initiators that do not or only slightly yellow such as phenylglyoxal acid, as described in DE-A 198 26 712, DE-A 199 13 353 or WO 98/33761.

Further suitable photo initiators are polymeric photo initiators, as for example the di-ester of carboxylmethoxy-benzophenone with polytetramethylen glycoles of different molar weights, preferably 200 to 250 g/mol (CAS 515136-48-8), as well as CAS 1246194-73-9, CAS 813452-37-8, CAS 71512-90-8, CAS 886463-10-1 or further polymeric benzophenone derivative, as for example known under the trade name Omnipol® BP of the company Rahn AG, Switzerland. In a further preferred embodiment, silsesquioxane compounds with at least one initiating group, as described in WO 2010/063612 A1, in particular on page 2, line 21 to page 43, line 9, preferably from page 2, line 21 to page 30, line 5 as well as in the examples of the WO 2010/063612 A1 mentioned compounds (all herewith incorporated by reference).

Typical mixtures comprise for example: 2-hydroxy-2-methyl-1-phenyl-propane-2-one and 1-hydroxy-cyclohexyl-phenylketone, bis(2,6-dimethoxybenzyl)-2,4,4-trimethyl-pentylphosphine oxide and 2-hydroxy-2-methyl-1-phenyl-propane-1-one, benzophenone and 1-hydroxy-cyclohexyl-phenylketone, bis(2,6-dimethoxybenzyl)-2,4,4-trimethylpentylphosphine oxide and 1-hydroxy-cyclohexyl-phenylketone, 2,4,6-trimethylbenzyldiphenyl-phosphine oxide and 2-hydroxy-2-methyl-1-phenyl-propane-1-one, 2,4,6-trimethylbenzophenone and 4-methylbenzophenone or 2,4,6-trimethylbenzophenone and 4-methylbenzophenone and 2,4,6-trimethylbenzyldiphenylphosphine oxide.

Particularly preferred among these photo initiators are: 2,4,6-trimethylbenzyldiphenylphosphine oxide, ethyl-2,4,6-trimethylbenzylphenyl-phosphinate, bis-(2,4,6-trimethyl-benzoyl)-phenylphosphine oxide, benzophenone, 1-benzyl-cyclohexan-1-ol, 2-hydroxy-2,2-di-methylacetophenone and 2,2-dimethoxy-2-phenylacetophenone.

The inventive, liquid, radiation-curable compounds can also be formed initiato-free, in particular if the subsequent curing is achieved by electron beams.

Preferably, a primer on the basis of an isocyanate is used:

The poly-isocyanate compound is preferably an aliphatic or cyclo-aliphatic compound, di- and poly-isocyanates with an NCO functionality of at least 1.8, preferably 1.8 to 5 and particularly preferred 2 to 4 and/or isocyanurates, biurates, allophanates and uretdiones thereof, which can be achieved from the base di-isocyanates in monomer form by oligomerization. The amount of isocyanate groups, calibrated as NCO=42 g/mol, is typically in the range of 5 to 25 weight percent.

A disadvantage of the use of such an isocyanate compound is that the layer remains liquid and can hardly be solidified in the ongoing manufacturing process, since the curing process takes several hours. Nevertheless, it was surprisingly found that it is possible to apply onto this wet layer additional layers of filler material and printing base coat as described above. That means that the isocyanate primer can be applied in the production line without any disturbances and the following layers can be applied directly thereon. Although the mechanisms are not fully understood, it is assumed that this is due to the porous structure of the carrier plate, which allows a good fixation of the still wet primer.

The isocyanate compound can be mixed with an acrylate compound. The advantage is that the acrylate compound can be fixed (slightly gelled) by means of radiation, whereby the isocyanate compound is likewise fixed. The chemical cross-linking by means of a poly-addition reaction of the isocyanates is completed over several hours. The final strength of the whole coating is reached typically after about 48 hours. The relation of isocyanate compound to acrylate compound should be chosen suitable. The best strength is in principle achieved if only isocyanate is used. The higher the amount of acrylate compound is, the less the resistivity of the flooring will be. A relationship of above 50% of an acrylate compound is therefore not suitable.

The acrylate compound is at least a mono-functional alkyl methacrylate, which comprises as a glass transition temperature of not more than 0° C. Preferably, alkyl methacrylate in the form of meth acryl acid ester of alkanols, which have 2 to 12 carbon atoms, is used. Particularly preferred, the alkyl methacrylate have a boiling point at normal pressure of at least 140° C., in particular of at least 200° C. This leads to a low volatility of the alkyl methacrylate.

Particularly preferred, the compound is chosen from the group consisting of: ethyl acrylate, propyl acrylate, isopropyl acrylate, n-Butyl acrylate, n-hexyl acrylate, n-octyl acrylate, 2-ethyl hexyl acrylate, 3-propyl heptyl acrylate, n-decyl acrylate, lauryl acrylate, n-pentyl methacrylate, n-octyl methacrylate, n-decyl methacrylate und lauryl methacrylate, butyl methacrylate, 2-ethylhexyl-acrylate or 3-propyl heptyl acrylate.

The flooring panel manufactured this way comprises preferably the following properties. Since such a panel is a complex product, which is made of an essentially non-organic mineral wool carrier plate and a polymeric coating, the different parts are separated as follows and described separately: 1. mineral wool or glass wool carrier plate and 2. the applied coating, which is mechanically separated from the carrier plate.

The carrier plate comprises preferably the following parameters: tensile strength, according to DIN EN310 of 15 to 50 N/m², more preferred 20 to 40 N/m² and most preferred 25 to 40 N/m². The young's module derived by the same method is preferably 3500 to 6000 N/m², more preferred 4000 to 6000 N/m². The stated parameters apply for temperatures between −20° C. and +70° C. The mechanically separated, cured oligomer coating comprises preferably the following mechanical properties:

The tensile strength, as derived, for example, from the test methods described in DIN EN ISO 527-1 and DIN EN ISO 527-2 is in the range of 3 to 30 N/mm², more preferred 5 to 20 N/mm², and even more preferred 6 to 18 N/mm². The corresponding young's modulus (also known as the elastic modulus) is preferably in the range of 400 to 3000 N/mm², more preferred 600 to 2500 N/mm² and even more preferred 800 to 2000 N/mm². The above-mentioned values apply for temperatures between −20° C. and +70° C.

Preferably, the carrier plate is provided on its side with coupling means in the form of tongue and groove elements that allow connection of several identical panels in directions parallel to the front side as well as perpendicular to the front side by means of a form fitting connection.

Preferably, the printing is done by means of direct printing with a digital printer. The major front surface of the carrier plate is in particular pre-treated before the printing, and in particular grinded and subsequently provided with a base coating. The subsequently applied oligomer layers are preferably essentially transparent, so that the printed decor is visible in the final product.

The carrier plate has preferably a thickness between 3 and 20 mm, more preferred between 4 and 15 mm, even more preferred between 3 and 12 mm and most preferred between 4 and 10 mm.

4. DESCRIPTION OF PREFERRED EMBODIMENTS

In the following the present invention is described in more detail under reference to the enclosed figures.

Figure 2:
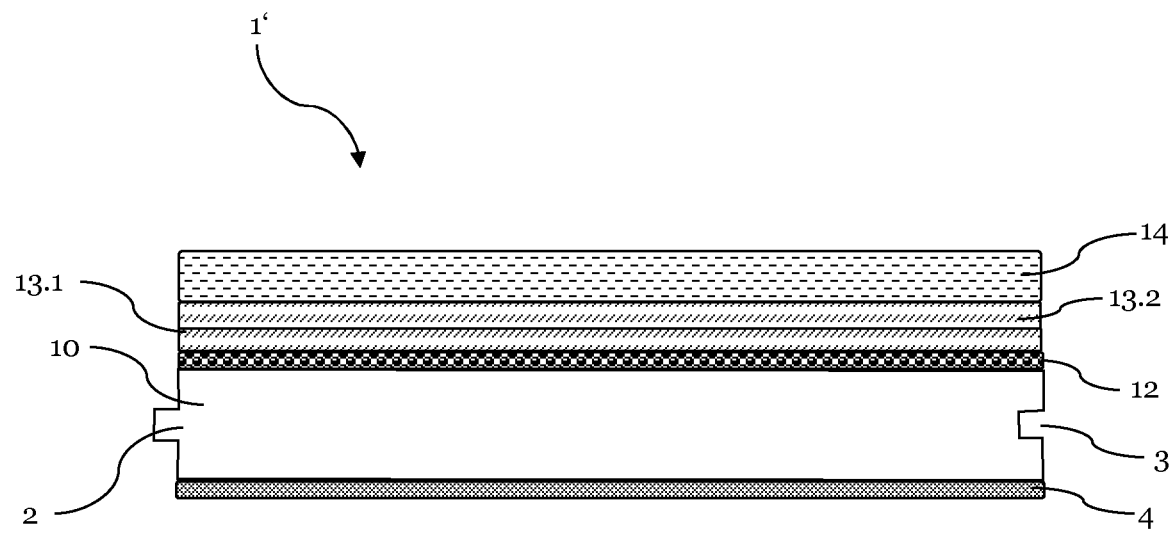
Figure 3:
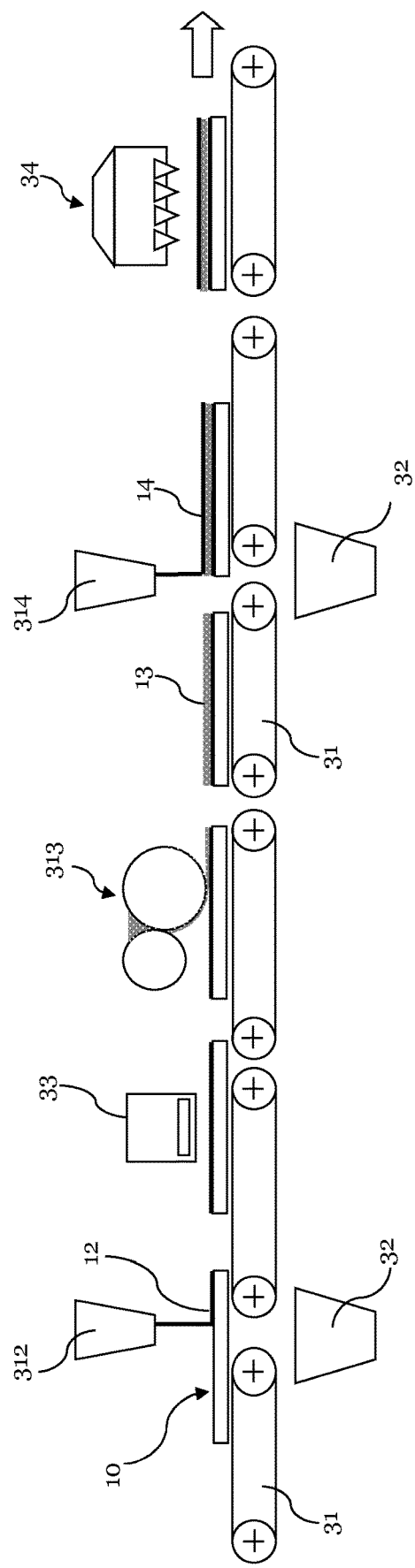

FIGS. 1 and 2 show exemplary layer arrangements in a schematic illustration; and FIG. 3 shows an exemplary facility for manufacturing an inventive panel in a schematic illustration.

In FIG. 1, a schematic layer structure for a panel 1 according to the invention is shown. The illustration is purely schematic and not up to scale. In particular, the carrier plate 10 is substantially thicker than the further layers 4, 12, 13 and 14, which are, for example, in the range of several hundred μm. The panel 1 can in addition comprise further layers, as in particular base coatings, a decor layer as well as eventually a primer layer for the decor layer and others.

In the shown example, the carrier plate 10 is provided with a thickness of approximately 8 mm and is made from mineral wool. On the rear, respectively back major surface of the carrier plate 10, a moisture barrier 4 in the form of a suitable plastic foil is applied. The moisture barrier is optional and depends on the material for the carrier plate 10 and the intended use. The carrier plate 10 further comprises coupling means in the form of groove 3, respectively tongue elements 2, which are only sketched in the figures. Suitable coupling means in the form of groove and tongue elements that allow a connection of several identical panels in directions parallel to the major front surface as well as perpendicular to the major front surface by means of form fitting are known to the skilled person, for example from the field of laminate floorings. It is referred for the details of such coupling means exemplarily to WO 0188306 or WO 0148332 of the same applicant, which contents are herewith incorporated by reference.

In the example of FIG. 1 onto the major front surface of carrier plate 10 a primer 12 was applied. Onto this primer a first layer of the liquid oligomer 13 was applied in an amount of 30 to 150 g/m². Above this first layer 13, a second layer 14 of a second oligomer is arranged, which is different from the first oligomer. Also this second layer 14 was applied in an amount of 30 to 150 g/m². Both layers 13 and 14 were applied wet on wet, so that at the border surface between both layers the two liquid base materials were partially mixed. The composition in this border region of both layers 13 and 14 is thus different to the composition of the base materials of layers 13 and 14.

In FIG. 2, a modified panel 1' is shown, wherein in contrast to panel 1 the application of the layer of the first oligomer is done in two partial steps. Thereby, in a first partial step, a first layer 13.1 is applied in an amount of 30 to 100 g/m². This applied substance was slightly gelled and after that in a second partial step, the rest of the first oligomer was applied as layer 13.2 onto the slightly gelled (not fully cured) surface of layer 13.1. Therefore, no mixture occurs between both layers 13.1 and 13.2. In the example of FIG. 2 in a next step, a second oligomer was applied onto the still wet layer 13.2 in the form of layer 14. At the border region between layer 13.2 and layer 14, a partial mixture of both layers occurred, since layer 13.2 was not slightly gelled. After application of layer 14, the whole layer system is preferably fully cured by means of radiation.

In the following, the manufacturing of an inventive panel is exemplarily described under reference to FIG. 3. FIG. 3 shows schematic a facility for the coating of carrier plates 10. The carrier plates are further processed after the coating in a separate cutting line (not shown) and provided with coupling means, i.e. with a suitable coupling profile, in particular with groove and tongue elements. The carrier plates 10 are based on mineral wool and have, for example, a thickness between 3 and 20 mm, a length (as seen in the transport direction of the facility of FIG. 3) of 150 to 200 cm and a width of 125 to 210 cm. However, also other dimensions for the carrier plates can be used, which are then cut into the desired form and shape at the end of the process. The stations shown in FIG. 3 of the facility are only exemplarily for the description of the inventive method and additional stations may be added as necessary. For example, before, after and between the shown stations additional processing stations may be provided, as in particular additional drying stations, stations for the application of primers, stations for the application of base coatings, control and monitoring devices, printing devices for application of a decor, etc.

The carrier plates 10 are transported through the coating facility by means of roll conveyors 31. At the first station 312 shown, a primer 12 is applied by means of a liquid curtain onto the major front surface of the carrier plates 10. The liquid curtain of the primer extends over the whole width of the plates and the plates are transported through this curtain and thereby coated with the primer. Underneath the station 312 for the application of the curtain, a container 23 is arranged, into which the liquid curtain falls, when no plate is transported through the curtain, as it, for example, occurs with the gaps between two successive plates.

In step 33 the primer is dried, for example by means of hot air. In station 313 onto the fully or partially dried primer 12 a first layer 13 of a first oligomer is applied in an amount of 30 to 150 g/m$^2$ onto the major front surface of carrier plate 10. The carrier plate is thereafter transported with the layer 13 of the first oligomer without any subsequent drying or curing. In a further station 314 an additional layer 14 of a liquid, second oligomer is applied onto the still wet surface of layer 13 of the first oligomer by means of, for example, a curtain coating. The second oligomer differs from the first oligomer and is likewise applied in an amount of 30 to 150 g/m$^2$. Finally, at station 3 or 4, the layers of the still wet oligomers are cured, preferably by means of radiation.

The invention claimed is:

1. A method for the manufacturing of a coated panel, in particular a wall, ceiling or flooring panel for applications in outdoor areas, comprising the following steps:
    a) providing a carrier plate of mineral wool and/or glass wool, having a major front surface and a rear surface;
    b) applying a primer onto the major front surface of the carrier plate; wherein the primer comprises isocyanates;
    c) thereafter, applying a liquid first oligomer in an amount of 30 to 150 g/m$^2$ onto the front major surface of the carrier plate;
    d) thereafter, applying a second liquid oligomer, which is different from the first oligomer, in an amount of 30 to 180 g/m$^2$ onto the wet surface of the first oligomer layer applied in step c); and
    e) thereafter, curing of the applied oligomers.

2. The method according to claim 1, wherein the first oligomer is applied in step c) in two or more partial steps.

3. The method according to claim 1, wherein step c) in a first partial step, the first oligomer is applied in an amount of 30 to 100 g/m$^2$, this amount is slightly gelled and in a second partial step, another 10 to 50 g/m$^2$ of this first oligomer is applied, onto the slightly gelled surface of the oligomer that was applied in the first partial step.

4. The method according to claim 1, wherein the first oligomer is a polyurethane acrylate, respectively based thereon.

5. The method according to claim 1, wherein the second oligomer is composed of the same chemical compounds as the first oligomer, however, in a different mixture, so that after curing the second oligomer has a greater hardness than the first oligomer.

6. The method according to claim 1, wherein the isocyanates comprise aliphatic or cyclo-aliphatic compounds, di- and polyisocyanates with an NCO functionality of at least 1.8 and/or the corresponding isocyanurates, biuretes, allophanates and uretdiones.

7. The method according to claim 1, wherein the primer comprises isocyanates and alkyl methacrylates.

8. The method according to claim 1, wherein the cured oligomer layers have a tensile strength of 3 to 30 N/mm$^2$.

9. The method according to claim 1, wherein the cured oligomer layers comprise a Young's modulus of 400 to 3000 N/mm$^2$.

10. The method according to claim 1, wherein the oligomers comprise at least one photo initiator.

11. The method according to claim 1, wherein the carrier plates are provided on their sides with coupling means in the form of groove and tongue elements, which allow a connection of several identical panels in directions parallel to the major front surface as well as perpendicular to the major front surface by means of a form fitting connection.

12. The method according to claim 1, wherein after step b), but for before step c), a decor layer is printed onto the major front surface of the carrier plate.

13. The method according to claim 1, wherein the carrier plate has a thickness between 3 and 20 mm.

14. The method according to claim 1, wherein the application in step c) is done by rollers and in step d) is done by curtain coating or by spraying.

15. The method according to claim 1, wherein the first oligomer is applied in an amount of 30 to 150 g/m$^2$.

16. The method according to claim 1, wherein the second oligomer is applied in an amount of 30 to 180 g/m$^2$.

17. The method according to claim 1, wherein the primer is applied in an amount of 3 to 300 g/m$^2$.

18. A panel obtainable by a process in accordance with claim 1.

19. A panel, in particular wall, ceiling or flooring panel for applications in outdoor areas, comprising a carrier plate of mineral wool and/or glass wool, having a front major surface and a rear surface, whereby the front major surface comprises a layer system having the following layers in the given order as seen from the carrier plate:
    a) a primer layer based on isocyanate;
    b) a first layer based on a first cured oligomer;
    c) a second layer based on a second cured oligomer, which differs from the first oligomer.

20. The panel according to claim 19, wherein the first oligomer is a polyurethane acrylate.

21. The panel according to claim 19, wherein the second oligomer consists of the same chemical compounds as the first oligomer, however, in a different mixture, so that the second oligomer has a greater hardness as the first oligomer, when cured.

22. The panel according to claim 19, wherein the isocyanate comprises aliphatic or cyclo-aliphatic compounds, di- and polyisocyanates with an NCO functionality of at least 1.8, and/or the corresponding isocyanurates, biuretes, allophanate and uretdiones.

23. The panel according to claim 19, wherein the primer comprises isocyanates and alkyl methacrylates.

24. The panel according to claim 19, wherein the oligomer layers after curing have a tensile strength of 3 to 30 N/mm$^2$.

25. The panel according to claim 19, wherein the cured oligomer layers comprise a Young's modulus of 400 to 3000 N/mm$^2$.

26. The panel according to claim 19, wherein the oligomers comprise at least one photo initiator.

27. The panel according to claim 19, wherein the carrier plate is provided on its sides with coupling means in the form of groove and tongue elements, which allow a coupling of several identical panels in directions parallel to the major front surface as well as perpendicular to the major front surface by means of a form fitting connection.

28. The panel according to claim 19, wherein the carrier plate has a thickness between 3 and 20 mm.

* * * * *